United States Patent [19]

Intrater et al.

[11] 4,374,903

[45] * Feb. 22, 1983

[54] METAL COATINGS OR METAL SANDWICHES WITH BORON NITRIDE OR TITANIUM DIBORIDE SUBSTRATES

[75] Inventors: Josef Intrater, Englewood Cliffs, N.J.; Gene Bertoldo, New York, N.Y.

[73] Assignee: Advanced Technology, Inc., Palisades Park, N.J.

[*] Notice: The portion of the term of this patent subsequent to Nov. 9, 1999, has been disclaimed.

[21] Appl. No.: 268,015

[22] Filed: May 28, 1981

Related U.S. Application Data

[63] Continuation-in-part of Ser. No. 242,716, Mar. 11, 1981, which is a continuation-in-part of Ser. No. 200,514, Oct. 24, 1980, which is a continuation-in-part of Ser. No. 157,310, Jun. 9, 1980, abandoned.

[51] Int. Cl.³ .............................................. C23C 9/10
[52] U.S. Cl. ..................................... 428/627; 428/457; 428/469; 428/472; 428/642; 428/646; 428/647; 428/675
[58] Field of Search ............... 428/457, 469, 472, 642, 428/646, 647, 648, 675, 627

[56] References Cited

U.S. PATENT DOCUMENTS 3,097,965  7/1963  Wilkins ............................ 428/648
3,860,443  1/1975  Lachman et al. ................ 427/113

Primary Examiner—W. Stallard
Attorney, Agent, or Firm—Fred A. Keire

[57] ABSTRACT

Substrates such as boron nitride and titanium diboride and the like joined to other metal or metal sandwiches useful as resistance elements.

10 Claims, No Drawings

METAL COATINGS OR METAL SANDWICHES WITH BORON NITRIDE OR TITANIUM DIBORIDE SUBSTRATES

This application is a continuation-in-part of U.S. Application Ser. No. 242,716 filed Mar. 11, 1981 which in turn is a continuation-in-part of Application Ser. No. 200,514 filed Oct. 24, 1980. The last is a continuation-in-part of our first filed Application Ser. No. 157,310, filed June 9, 1980, and now abandoned.

In our previous applications we had disclosed various tin, lead or indium compositions with carbide or carbonyl formers for making adherent composites with a carbon, such as graphite, diamond, etc. and other very hard to bond substrates. In addition, we have found that these substrates, when these have the tin, lead or indium compositions deposited thereon and treated as disclosed in our previous application, possess the heretofore unobserved ability to bond other metals to these hard to bond substrates. For example, copper when thus bonded to tin alloys, forms a bronze composition which has enhanced temperature properties and the composite, such as the graphite, tin, and copper, when the last two are converted to bronze, form graphite-bronze composites having useful temperature limits far in excess of that achievable with tin alone.

We have now further found that when these and other substrates are employed with the metal being in sandwich form, such as nickel-copper-nickel, even further additional and beneficial properties can be obtained and the temperature limits further improved.

Still further, we have also found that when boron nitride, titanium diboride ($TiB_2$) or mixtures of born nitride and titanium diboride are used as substrates, these also form, with the tin, lead, indium and alloys thereof, in admixture with the carbonyl or carbide formers, adherent composites having outstanding properties. These composites can then be used for the purposes such as previously indicated and for other purposes, such as for resistance elements in an atmosphere requiring no contamination from the resistance element. That type of contamination is highly undesirable, e.g., in semi-conductor manufacture or in silicon metal manufacture, i.e. single crystal growth or epitaxial silicon growth where the silicon is used, such as for solar cells.

Of the various composites, as illustrated above, the previously disclosed methods for fabricating the composites are equally applicable, namely, the deposition of an admixture, the deposition of a compacted powder preform, or the deposition of a metal on a powder mixture or on a preform, either of which may be on the substrate or the metals for forming the composite.

Inasmuch as our previous application disclosed the full details of the various processes, as well as the carbide or carbonyl formers, the previous Application Ser. No. 242,716 is incorporated by reference herein and forms part of this application.

The following further examples are illustrative of our broader invention and are to be construed as illustrations and not as limitations thereof.

EXAMPLE 1

When boron nitride is used as a substrate, an adherent coating, with a substantially void free inteface, of tin chromium composition, (90% tin—10% chromium, by weight, in 100% CO atmosphere) forms on the surface of the boron nitride. This composition will not dewet. Similarly to a graphite substrate, a copper layer on tin coating thereof will form bronze. In addition to boron nitride, titanium diboride ($TiB_2$) when it is coated with the composition described above, (or when sandwiches with copper are formed with the coating), exhibit excellent structural properties, e.g. strength. Mixtures of boron nitride and $TiB_2$ have been similarly joined with tin and the carbide or corbonyl formers or the various admixtures thereof, e.g. the above 90% tin—10% chromium compositions. Boron nitride is an exellent abrasive and boron nitride—$TiB_2$ mixtures are excellent resistance elements.

EXAMPLE 2

The carbide or carbonyl formers with tin, lead or indium alloys i.e., chromium, titanium, hafnium, zirconium, cobalt, iron, nickel, manganese, rhenium, ruthenium, rhodium, osmium, iridium, vanadium, niobium, tantalum, tungsten or molybdenum, or mixtures of same, are choices for the boron nitride or titanium diboride substrates or these substrates may be as mixtures of each other, e.g. 1:1 mixtures (by weight). To these substrate compositions other metals are joined as adherant composites (as well as to the previously mentioned substrates), e.g., onto tin are placed, for example, copper and nickel in various proportions, e.g. of the Monel metal type, or as nickel-copper-nickel sandwich of a thickness from 1 to 10 mils for nickel and 2 to 5 mils to 0.1 inch copper. A 1 mil Ni, 5 mil Cu, 1 mil Ni works especially well for forming on a graphite, a composite of same with the 90% tin—10% chromium preform composition. Various other sandwich overlays of nickel, copper, molybdenum, etc. may be used.

What is claimed is:

1. A composite of tin, lead, indium, a tin alloy, a lead alloy or an indium alloy as component in a combination with a carbide or carbonyl former, as an adherent coating, film or layer on a base or substrate of boron nitride or titanium diboride, or mixtures thereof.

2. The composite as defined in claim 1, wherein the carbide or carbonyl former is chromium, titanium, hafnium, zirconium, cobalt, iron, nickel, manganese, rhenium, ruthenium, rhodium, osmium, iridium, vanadium, niobium, tantalum, tungsten or molybdenum, or mixtures of same.

3. The composite as defined in claim 2, wherein the adherent coating film or layer is further overlaid with an adherent, copper, nickel, molybdenum or a sandwich layer of these metals.

4. The composite as defined in claim 3, wherein the adherent overlaid layer is a nickel-copper-nickel composite.

5. The composite as defined in claim 1, wherein the substrate is a mixture of boron nitride and titanium diboride.

6. The composite as defined in claim 1, wherein the substrate is boron nitride.

7. The composite as defined in claim 1, wherein the substrate is titanium diboride.

8. The composite as defined in claim 1, wherein tin is in combination with chromium as an adherent with coating on boron nitride substrate.

9. The composite as defined in claim 1, wherein the substrates is a mixture of boron nitride and titanium diboride in a ratio of 1:1 by weight.

10. The composite as defined in claim 4, wherein the overlaid layer is on a graphite substrate.